(12) United States Patent
Kale et al.

(10) Patent No.: US 8,621,648 B2
(45) Date of Patent: Dec. 31, 2013

(54) METHOD AND SYSTEM FOR SECURE EXCHANGE AND USE OF ELECTRONIC BUSINESS CARDS

(75) Inventors: Mandar A. Kale, Bangalore (IN); Shirish K. Peshwe, Bangalore (IN); Vishnu Nanda, Karnataka (IN); Kashinath Kakarla, Bangalore (IN)

(73) Assignee: Intuit Inc., Mountain View, CA (US)

( * ) Notice: Subject to any disclaimer, the term of this patent is extended or adjusted under 35 U.S.C. 154(b) by 400 days.

(21) Appl. No.: 12/772,695

(22) Filed: May 3, 2010

(65) Prior Publication Data

US 2011/0271108 A1    Nov. 3, 2011

(51) Int. Cl.
*G06F 7/04*    (2006.01)

(52) U.S. Cl.
USPC ........................................... 726/27

(58) Field of Classification Search
USPC ........... 713/150, 168, 170, 153; 726/27, 4, 17
See application file for complete search history.

(56) References Cited

U.S. PATENT DOCUMENTS

| | | | |
|---|---|---|---|
| 2001/0020239 A1* | 9/2001 | Ukigawa et al. | 707/104.1 |
| 2005/0182644 A1* | 8/2005 | Douvikas et al. | 705/1 |
| 2007/0022302 A1* | 1/2007 | Richards et al. | 713/185 |
| 2010/0099459 A1* | 4/2010 | Silverbrook et al. | 455/556.1 |
| 2012/0290601 A1* | 11/2012 | Huang | 707/769 |

* cited by examiner

*Primary Examiner* — Beemnet Dada
(74) *Attorney, Agent, or Firm* — Park, Vaughan, Fleming & Dowler LLP; Chia-Hsin Suen

(57) ABSTRACT

Some embodiments provide a system that facilitates the use of an electronic business card. During operation, the system obtains one or more permissions for the electronic business card. Next, the system manages use of the electronic business card by a recipient of the electronic business card based on the permissions.

23 Claims, 6 Drawing Sheets

```
<SMAP:SubmitRequest
    xmlns:SMAP="http://www.smsforum.net/schemas/smap/v1.0"
    xsi:schemaLocation="http://www.smsforum.net/schemas/smap/v1.0
        http://www.smsforum.net/schemas/smap/v1.0/smap.xsd">
  <SMAP:ShortMessage>

<SMAP:Header>
      <SMAP:Destination>
        <SMAP:Number>+123456789</SMAP:Number>
      </SMAP:Destination>
    </SMAP:Header>

<SMAP:Body>
      <SMAP:Text>

BEGIN:VCARD
        VERSION:3.0
        N:Doe;John
        FN:John Doe II
        ORG:Doe Inc.
        TEL;TYPE=WORK,VOICE:18DF733256D44E32
        EMAIL;TYPE=PREF,INTERNET:jCeH5IL+jDcFfjCgE5OB/UkY1a
        X-INTUIT-FORWARDDISABLED: TRUE
        X-INTUIT-VISIBLE: 11100
        X-INTUIT-TTL: 12/10/2012 10:00:00 UTC
        END:VCARD </SMAP:Text>
    </SMAP:Body>

</SMAP:ShortMessage>
</SMAP:SubmitRequest>
```

302 — VERSION:3.0
304 — N:Doe;John
306 — FN:John Doe II
308 — (ORG:Doe Inc.)
310 — TEL;TYPE=WORK,VOICE:18DF733256D44E32
312 — EMAIL;TYPE=PREF,INTERNET:jCeH5IL+jDcFfjCgE5OB/UkY1a
314 — X-INTUIT-FORWARDDISABLED: TRUE
316 — X-INTUIT-VISIBLE: 11100

FIG. 3

METHOD AND SYSTEM FOR SECURE EXCHANGE AND USE OF ELECTRONIC BUSINESS CARDS

BACKGROUND

Related Art

The present embodiments relate to electronic business cards. More specifically, the present embodiments relate to a method and system for facilitating the secure exchange and use of electronic business cards.

Electronic business cards may be used to exchange contact information for entities such as individuals or companies. For example, an electronic business card may contain a name, email address, mailing address, title, organization, phone number, website, and/or other contact details for an entity such as an individual or organization. The electronic business card may be sent to a number of recipients to facilitate communication between the recipients and the entity. More specifically, an electronic business card may be sent to a recipient via email, Short Message Service (SMS), HyperText Transfer Protocol (HTTP), and/or another digital communications mechanism. The recipient may then call the company using a phone number from the electronic business card, email the company using an email address in the electronic business card, and/or visit the company at a street address stored in the electronic business card.

On the other hand, electronic business cards allow for the potentially unrestricted transmission and/or use of an entity's contact details. For example, a recipient of an electronic business card may choose to forward the electronic business card to an arbitrary group of people. Similarly, the posting of an electronic business card to a webpage may let anyone on the Internet download and view the contents of the electronic business card.

Such uncontrolled exchange of electronic business cards may cause problems with privacy and/or unwanted contact. For example, contact details from an electronic business card for a prominent individual may allow others to harass and/or stalk the individual. Electronic business cards may also be used to send spam email and/or make unsolicited (e.g., telemarketing) calls. In addition, personal and/or contact details from an electronic business card may be used to commit identity theft and/or other types of fraud.

Hence, what is needed is a mechanism for securing the use and exchange of electronic business cards.

SUMMARY

The disclosed embodiments provide a system that facilitates the use of an electronic business card. During operation, the system obtains one or more permissions for the electronic business card. Next, the system manages use of the electronic business card by a recipient of the electronic business card based on the permissions.

In some embodiments, the system also receives the electronic business card and the permissions from a sender of the electronic business card.

In some embodiments, the permissions include at least one of a visibility permission and a forwarding permission.

In some embodiments, managing use of the electronic business card by the recipient of the electronic business card based on the permissions involves:
(i) enabling communication between the recipient and an entity represented by the electronic business card;
(ii) using the forwarding permission to control forwarding of the electronic business card by the recipient; and
(iii) using the visibility permission to control viewing of one or more contact details in the electronic business card by the recipient.

In some embodiments, enabling communication between the recipient and the entity involves providing the contact details to the recipient if the visibility permission is granted, and allowing the recipient to contact the entity without viewing the contact details if the visibility permission is denied.

In some embodiments, the contact details are encrypted if the visibility permission is denied. To allow the recipient to contact the entity without viewing the contact details, the system provides the encrypted contact details to a routing apparatus and establishes contact with the entity through the routing apparatus.

In some embodiments, using the forwarding permission to control forwarding of the electronic business card by the recipient involves disabling forwarding of the electronic business card by the recipient if the forwarding permission is denied. If the forwarding permission is granted, the system enables forwarding of the electronic business card by the recipient and also enables modification of at least some of the permissions by the recipient prior to forwarding the business card.

In some embodiments, the contact details include name, an email address, a phone number, a mailing address, a website, or a username.

In some embodiments, managing use of the electronic business card by the recipient of the electronic business card based on the permissions further involves using a time-to-live (TTL) attribute to limit forwarding of the electronic business card.

BRIEF DESCRIPTION OF THE FIGURES

FIG. 3 shows an exemplary electronic business card in accordance with an embodiment.

In the figures, like reference numerals refer to the same figure elements.

DETAILED DESCRIPTION

Figure 1:
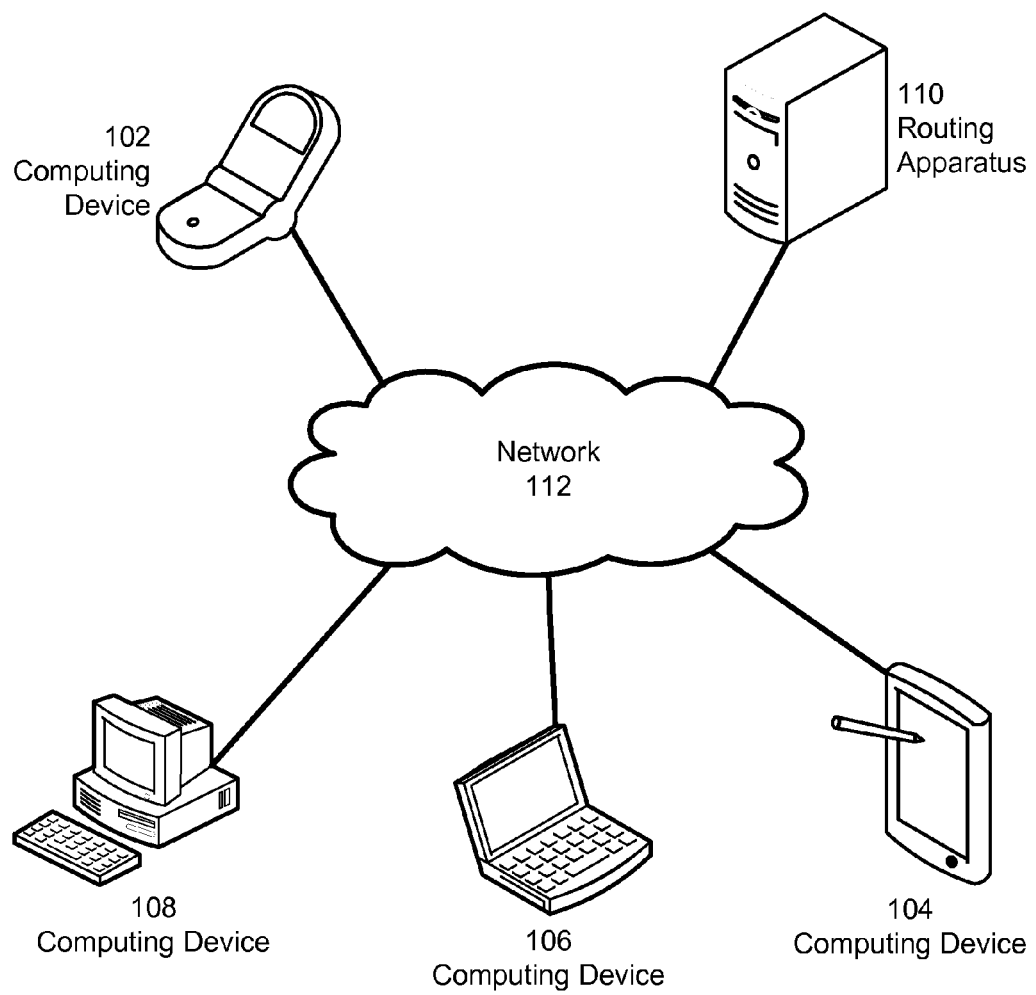
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for processing electronic business cards. Each electronic business card may include contact details for an entity such as an individual, business, and/or organization. The contact details may include a name, an email address, a phone number, a mailing address, a website, and/or a username. The electronic business card may be transmitted to a recipient to enable communication between the recipient and the entity.

More specifically, embodiments provide a method and system for facilitating the secure exchange and use of electronic business cards. Each electronic business card may be associated with one or more permissions, such as a visibility permission and a forwarding permission. The visibility permission may restrict the recipient's viewing of the contact details in the electronic business card. If the visibility permission is granted, the contact details may be provided to the recipient. If the visibility permission is denied, the recipient may be allowed to contact the entity without viewing the contact details. In particular, the contact details may be encrypted if the visibility permission is denied; to enable communication between the recipient and the entity, the encrypted contact details may be provided to a routing apparatus. The routing apparatus may decrypt the encrypted contact details and route communication from the recipient to the entity using the decrypted contact details without providing the decrypted contact details to the recipient.

Along the same lines, the forwarding permission may restrict the recipient's ability to forward the electronic business card to others. If the forwarding permission is denied, the recipient may be blocked from forwarding the electronic business card. If the forwarding permission is granted, the recipient may be allowed to forward the electronic business card, and may also be allowed to modify at least some of the permissions prior to forwarding. In particular, the recipient may be allowed to remove one or more of the permissions for the electronic business card prior to forwarding the electronic business card to one or more new recipients. For example, the recipient may remove the visibility permission to prevent the new recipients from viewing the contact details. Similarly, the recipient may remove the forwarding permission so that the new recipients are unable to re-forward the electronic business card.

FIG. 1 shows a schematic of a system in accordance with an embodiment. As shown in FIG. 1, the system includes a number of computing devices 102-108 and a routing apparatus 110. Computing devices 102-108 may be connected to each other and to routing apparatus 110 through a network 112. Each of these components is discussed in further detail below.

Computing devices 102-108 may correspond to electronic devices that provide services or functions to a user. For example, computing devices 102-108 may operate as mobile phones, personal computers (PCs), laptop computers, workstations, global positioning system (GPS) receivers, portable media players, and/or personal digital assistants (PDAs). In addition, each computing device 102-108 may include an operating system (not shown) that coordinates the use of hardware and software resources on the computing device, as well as one or more applications that perform specialized tasks for the user. For example, computing devices 102-108 may include applications such as an email client, address book, document editor, web browser, accounting application, calendar application, and/or media player. To perform tasks for the user, applications may obtain the use of hardware resources (e.g., processor, memory, I/O components, network interface card, graphics-processing unit (GPU), etc.) from the operating system, as well as interact with the user through a hardware and/or software framework provided by the operating system.

Network 112 may correspond to a local area network (LAN), wide area network (WAN), wireless network, mobile phone network, Bluetooth (Bluetooth™ is a registered trademark of Bluetooth Sig, Inc.) network, intranet, Internet, and/or other type of network that facilitates communication among computing devices 102-108 through one or more communications channels. For example, users of computing devices 102-108 may connect to network 112 to send and receive emails, retrieve webpages, make phone calls, send and receive Short Message Service (SMS) messages, and/or transfer files with one another.

In addition, each user may be associated with one or more contact details that may be used to contact the user through network 112. The contact details may include a name, an email address, a phone number, a mailing address, a website, and/or a username. For example, a first user may contact a second user by composing an email addressed to an email address for the second user. The email may be sent from computing device 104 through network 112 to a mail server. The mail server may store the email until the second user logs into the email account associated with the email address on computing device 108. The mail server may then transmit the email through network 112 to computing device 108 for viewing by the second user.

In one or more embodiments, electronic business cards are used to facilitate communication among users of computing devices 102-108. An electronic business card may contain contact details for an entity such as an individual or organization. For example, the electronic business card may correspond to a vCard or an hCard. The electronic business card may be transmitted to other individuals and/or organizations (e.g., users of computing devices 102-108) via email, Short Message Service (SMS), HyperText Transfer Protocol (HTTP), and/or other digital communications mechanisms provided by network 112. In other words, the electronic business card may allow contact details for the entity to be digitally transmitted among computing devices 102-108 and used by users of computing devices 102-108.

However, electronic business cards may be associated with privacy and/or security issues. In particular, an electronic business card may lack mechanisms for restricting the arbitrary forwarding and/or use of contact details in the electronic business card. As a result, the contact details may be freely transmitted and/or published, which in turn may allow others to spam, call, harass, and/or commit fraud against the entity.

In one or more embodiments, computing devices 102-108 and/or routing apparatus 110 include functionality to facilitate the secure exchange and use of electronic business cards. Each electronic business card may be associated with one or more permissions, such as a visibility permission and a forwarding permission. In addition, a card-processing apparatus on each computing device 102-108 may use the permissions to manage use of the electronic business card by a recipient of the electronic business card. The visibility permission may restrict the recipient's viewing of contact details in the electronic business card, while the forwarding permission may restrict the recipient's ability to forward the electronic business card to others. As discussed below with respect to FIG. 2, the enforcement of permissions by the card-processing apparatus and routing apparatus 110 may prevent unwanted access to and/or forwarding of the contact details in the electronic business card.

Figure 2:
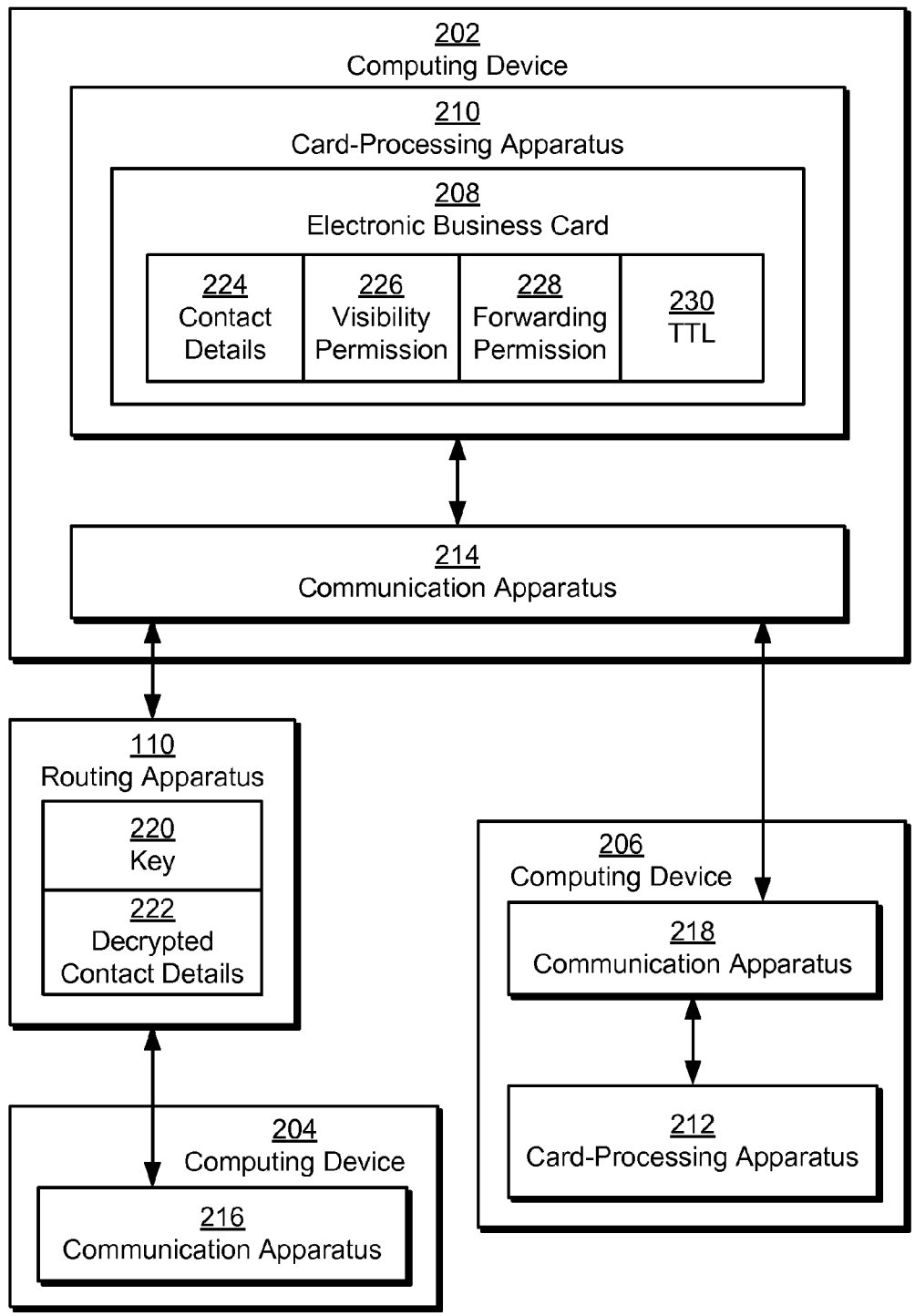
FIG. 2 shows the use of an electronic business card in accordance with an embodiment.

FIG. 2 shows the use of an electronic business card 208 in accordance with an embodiment. As described above, electronic business card 208 may include a set of contact details 224 for an entity such as an individual or an organization. Contact details 224 may include a name, an email address, a phone number, a mailing address, a website, and/or a username for the entity.

Electronic business card 208 may be sent over a network (e.g., network 112 of FIG. 1) and received by a communication apparatus 214 on a computing device 202. For example, communication apparatus 214 may correspond to a wireless transceiver, network interface card (NIC), port, and/or other component that allows computing device 202 to send and receive data over the network. In addition, electronic business card 208 may be transmitted to and from computing device 202 using Secure Socket Layer (SSL), Transport Layer Security (TLS), and/or other mechanism for securing communication over the network.

A user of computing device 202 may correspond to a recipient of electronic business card 208 that uses contact details 224 to communicate with an entity represented by electronic business card 208. For example, the user may call the entity using a phone number in electronic business card 208, email the entity using an email address in electronic business card 208, and/or send an instant message to the entity using a username in electronic business card 208.

In one or more embodiments, use of electronic business card 208 is managed by a card-processing apparatus 210 in computing device 202 based on a visibility permission 226 and a forwarding permission 228. Visibility permission 226 and forwarding permission 228 may be stored in electronic business card 208 along with contact details 224. Alternatively, visibility permission 226 and forwarding permission 228 may be stored and obtained separately from electronic business card 208. For example, visibility permission 226 and forwarding permission 228 may be stored on a remote server and/or routing apparatus 110 and retrieved by card-processing apparatus 210 upon receiving electronic business card 208.

In one or more embodiments, card-processing apparatus 210 enables communication between the recipient and the entity represented by electronic business card 208. In other words, card-processing apparatus 210 may allow the user of computing device 202 to contact the entity at another computing device (e.g., computing devices 204-206) using one or more communications channels associated with contact details 224. At the same time, card-processing apparatus 210 may use forwarding permission 228 to control forwarding of electronic business card 208 by the user and use visibility permission 226 to control viewing of one or more contact details 224 by the user. In other words, card-processing apparatus 210 may enforce the secure use and exchange of electronic business card 208 by the user.

Visibility permission 226 may restrict the user's viewing of contact details 224. If visibility permission 226 is granted, the contact details 224 may be provided (e.g., displayed) to the user to enable communication with the entity. For example, card-processing apparatus 210 may display a phone number and email address of the entity to the user within a graphical user interface (GUI) on computing device 202 if visibility permission 226 is granted. The user may then call the entity by dialing the phone number using communication apparatus 214 and/or another computing device (e.g., mobile phone).

If visibility permission 226 is denied, the user may be allowed to contact the entity without viewing contact details 224. In particular, one or more contact details 224 may be encrypted if visibility permission 226 is denied to prevent the user from viewing the contact details. To enable communication between the user and the entity, card-processing apparatus 210 may provide the encrypted contact details 224 to routing apparatus 110. Routing apparatus 110 may decrypt the encrypted contact details 224 using a key 220 and route communication from the user to the entity using the decrypted contact details 222 without providing decrypted contact details 222 to the user.

For example, an email address in contact details 224 may be encrypted if visibility permission 226 is denied. As a result, the user may be unable to directly contact the entity using the email address. Instead, card-processing apparatus 210 may transmit the encrypted email address to routing apparatus 110. In turn, routing apparatus 110 may obtain a plaintext version of the email address by decrypting the email address with key 220. Routing apparatus 110 may also provide an anonymous email address to card-processing apparatus 210 to allow the user to contact the entity without revealing the decrypted email address to the user. Emails addressed to the anonymous email address may be received by routing apparatus 110 and forwarded to the decrypted email address. The entity may then receive the emails by logging into the email account for the decrypted email address using computing device 204 and downloading the emails using a communication apparatus 216 on computing device 204.

Forwarding permission 228 may restrict the user's ability to forward electronic business card 208 to others. If forwarding permission 228 is denied, the user may be blocked from forwarding electronic business card 208. In other words, card-processing apparatus 210 may prevent the user from transmitting the contents of electronic business card 208 to one or more new recipients if forwarding permission 228 is denied.

If forwarding permission 228 is granted, the user may be allowed to forward electronic business card 208. For example, the user may forward electronic business card 208 to a user of computing device 206 by attaching electronic business card 208 to an email addressed to the other user. The other user may receive the email from the network using a communication apparatus 218 in computing device 206. The other user may then use electronic business card 208 by opening electronic business card 208 with a card-processing apparatus 212 in computing device 206. On the other hand, forwarding of electronic business card 208 may fail if the computing device (e.g., computing device 204) to which electronic business card 208 is forwarded does not include a card-processing apparatus and/or other mechanism for securing the exchange and use of electronic business card 208. Likewise, forwarding of electronic business card 208 may be restricted if the network does not include SSL, TLS, and/or other mechanism for securing communication between computing devices 202-206.

In addition, the user may be allowed to modify at least some of the permissions prior to forwarding electronic business card 208. In particular, the user may be allowed to remove, but not add, one or more of the permissions for electronic business card 208 before forwarding electronic business card 208 to one or more new recipients. For example, the user may remove visibility permission 226 so that the new recipients are not able to view contact details 224, even if the user is able to view contact details 224. Similarly, the user may remove forwarding permission 228 so that the new recipients are unable to re-forward electronic business card 208.

The use of visibility permission 226 and forwarding permission 228 may thus provide fine-grained control of the use and exchange of electronic business card 208. More specifically, electronic business card 208 may enable contact with the entity through card-processing apparatus 210 and/or routing apparatus 110, while visibility permission 226 and/or forwarding permission 228 may be used to anonymize potentially sensitive information and/or mitigate the unrestricted transmission of contact details 224.

Use and exchange of electronic business card 208 may further be managed with a time-to-live (TTL) 230 attribute. As with visibility permission 226 and forwarding permission 228, TTL 230 may be set by the entity represented by electronic business card 208 and/or another creator of electronic business card 208. However, TTL 230 may not be modified by recipients of electronic business card 208.

In one or more embodiments, TTL 230 limits forwarding of electronic business card 208. For example, TTL 230 may specify a date and/or time that causes forwarding permission 228 to be disabled after the date and/or time is exceeded. On the other hand, the TTL attribute may include a number of "hops" electronic business card 208 may make from the creator's computing device to other computing devices (e.g., computing devices 202-206) before forwarding permission 228 is disabled.

FIG. 3 shows an exemplary electronic business card in accordance with an embodiment. The electronic business card may be encoded using Extensible Markup Language (XML) and may be transmitted via email, SMS, HTTP, online file transfer, and/or other digital communications mechanisms. As shown in FIG. 3, the electronic business card may include XML tags for Short Message Application Part (SMAP) transmission and management of the message containing the electronic business card, while the content of the electronic business card may be provided using the vCard format. Consequently, the electronic business card may facilitate the exchange and use of a set of contact details 302-310 for an entity represented by the electronic business card.

In addition, a forwarding permission 312 and a visibility permission 314 may be used to secure the exchange and/or use of the electronic business card. As shown in FIG. 3, forwarding permission 312 is denied (e.g., "X-INTUIT-FORWARDDISABLED: TRUE"). As a result, a recipient of the electronic business card may be blocked from forwarding the electronic business card to one or more new recipients.

On the other hand, visibility permission 314 (e.g., "X-INTUIT-VISIBLE") is associated with a set of flags (e.g., "11100"). A flag may be set if the corresponding contact detail in the electronic business card is visible and cleared if the corresponding contact detail is encrypted. The first three flags of visibility permission 314 are set, indicating that the electronic business card includes a set of plaintext contact details 302-306 that may be directly viewed by the user. In particular, the recipient may be able to view the entity's name (e.g., "Doe; John"), formatted name (e.g., "John Doe II"), and organization (e.g., "Doe Inc.") in the electronic business card.

However, the last two flags of visibility permission 314 are cleared, indicating that the last two contact details 308-310 are encrypted to prevent the recipient of the electronic business card from directly viewing contact details 308-310. Instead, the encrypted contact details may be provided to a routing apparatus (e.g., routing apparatus 110 of FIG. 1) to establish contact with the entity. The routing apparatus may decrypt the encrypted contact details and route communication from the recipient to the entity using the decrypted contact details without providing the decrypted contact details to the recipient. The last two flags of visibility permission 304 may further be enforced by masking contact details 312-314 in telephone bills, email contact lists, and/or other locations in which contact details 312-314 may be displayed.

Finally, a TTL attribute 316 (e.g., "X-INTUIT-TTL") may be used to limit the forwarding of the electronic business card. TTL attribute 316 may be set by the creator of the electronic business card and may not be subsequently modified by recipients of the electronic business card. TTL attribute 316 includes a timestamp (e.g., "12/10/2012 10:00:00 UTC") that prevents forwarding of the electronic business card, even if forwarding permission 312 is enabled.

Alternatively, TTL attribute 316 may include a counter representing the maximum number of times the electronic business card may be forwarded. For example, the electronic business card may be created with TTL attribute 316 set to a counter value of "2." After the creator forwards the electronic business card to a recipient, the counter value may be decremented to "1" by a card-processing apparatus (e.g., card-processing apparatus 210 of FIG. 2) on the recipient's computing device. If the recipient further forwards the electronic business card to a subsequent recipient, the counter value may be decremented to "0" by a card-processing apparatus on the subsequent recipient's computing device. As a result, the subsequent recipient may be unable to forward the electronic business card, even if forwarding permission 312 is enabled for the subsequent recipient.

Figure 4:
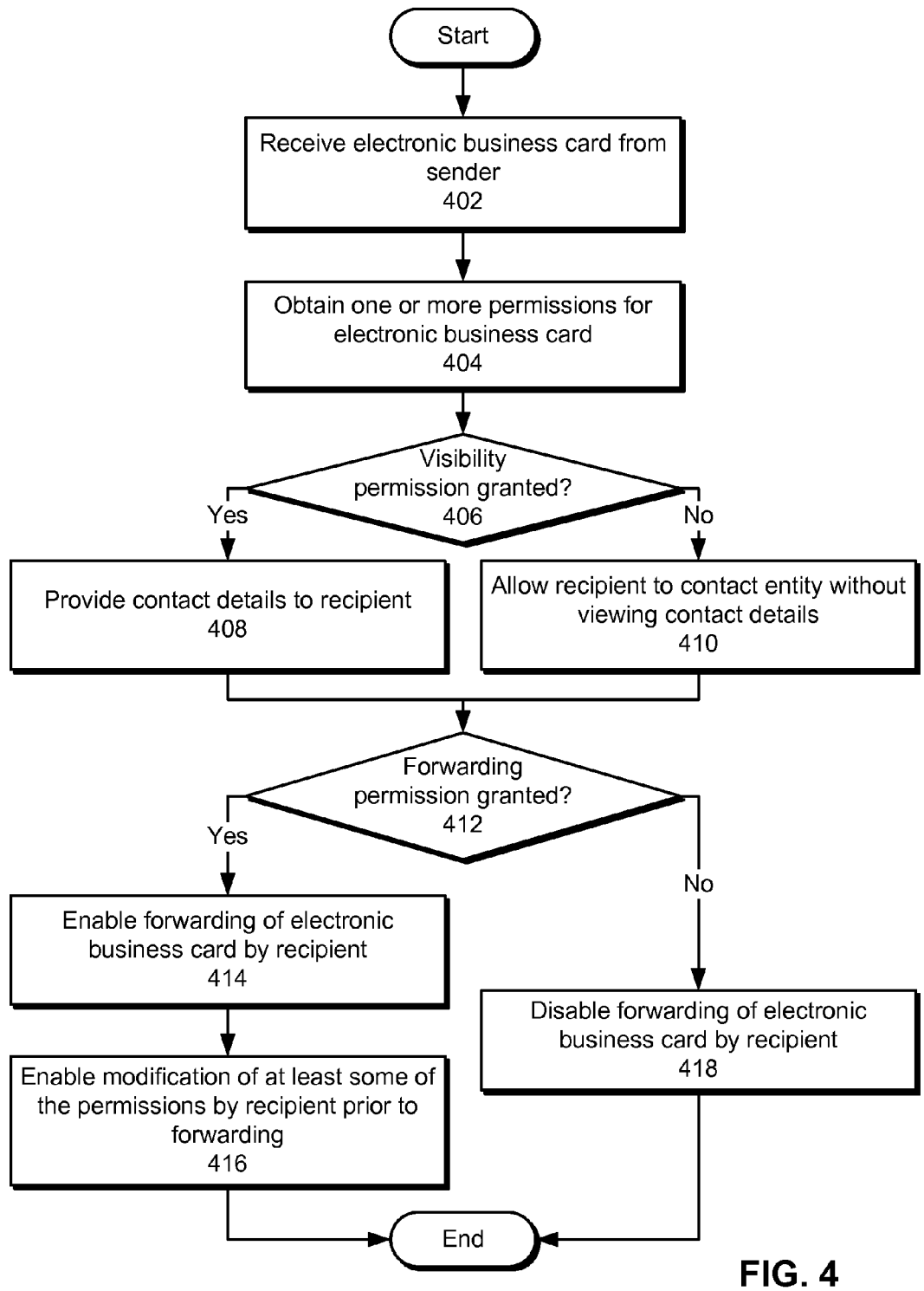
FIG. 4 shows a flowchart illustrating the process of facilitating the use of an electronic business card in accordance with an embodiment.

FIG. 4 shows a flowchart illustrating the process of facilitating the use of an electronic business card in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, the electronic business card is received from a sender (operation 402). For example, the sender may transmit the electronic business card over a network via an email, SMS message, File Transfer Protocol (FTP) upload, and/or an online file transfer. The electronic business card may additionally be transmitted using SSL, TLS, and/or other mechanisms for securing communication over a network. One or more permissions for the electronic business card are also obtained (operation 404). The permissions may also be obtained from the sender (e.g., within the electronic business card) and/or from another source, such as the entity represented by the electronic business card.

The permissions may be used to manage use of the electronic business card by a recipient of the electronic business card. First, the granting or denying of the visibility permission (operation 406) may control viewing of one or more contact details in the electronic business card by the recipient. If the visibility permission is granted, the contact details in the electronic business card are provided to the recipient to enable communication between the recipient and the entity (operation 408). For example, the recipient may call the entity by obtaining a phone number for the entity from the electronic business card if the visibility permission is granted.

If the visibility permission is denied, the recipient is allowed to contact the entity without viewing the contact details (operation 410). To prevent the recipient from viewing the contact details, the contact details may be encrypted. In addition, the encrypted contact details may be provided to a routing apparatus, and contact with the entity may be established through the routing apparatus. The operation of the routing apparatus is discussed in further detail below with respect to FIG. 5.

Next, the granting or denying of the forwarding permission (operation 412) may control forwarding of the electronic business card by the recipient. If the forwarding permission is denied, forwarding of the electronic business card by the recipient is disabled (operation 418). The denying of the forwarding permission may thus mitigate the unrestricted transmission of the electronic business card by the recipient and/or by subsequent recipients.

If the forwarding permission is granted, forwarding of the electronic business card by the recipient is enabled (operation 414). Furthermore, the recipient may be allowed to modify at least some of the permissions prior to forwarding (operation 416). In particular, the recipient may remove, but not add, permissions to the electronic business card prior to forwarding. For example, the recipient may remove the forwarding permission prior to forwarding the electronic business card to a new recipient to prevent the new recipient from re-forwarding the electronic business card. Along the same lines, the recipient may remove the visibility permission to prevent the new recipient from directly viewing the contact details, even if the recipient is able to view to the contact details. Conversely, the recipient may only forward the electronic business card with the visibility permission denied if the recipient is unable to view the contact details. As discussed above, exchange of the electronic business card may further be managed using a TTL attribute that limits forwarding of the electronic business card.

Figure 5:
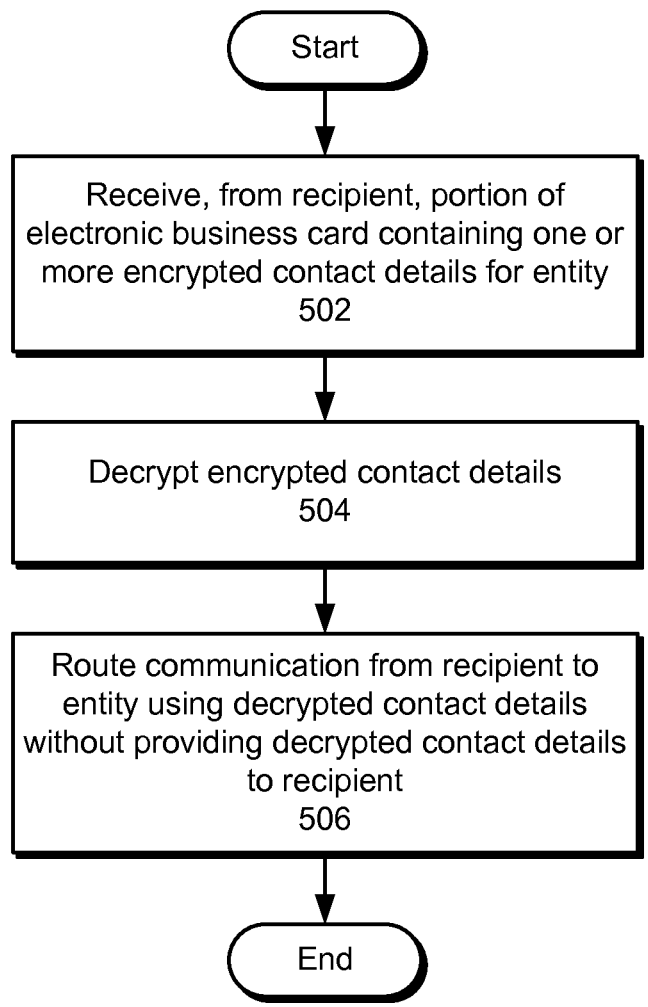
FIG. 5 shows a flowchart illustrating the process of enabling communication between a recipient of an electronic business card and an entity represented by the electronic business card in accordance with an embodiment.

FIG. 5 shows a flowchart illustrating the process of enabling communication between a recipient of an electronic business card and an entity represented by the electronic business card in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

First, a portion of the electronic business card containing one or more encrypted contact details for the entity is received from the recipient (operation 502). The encrypted contact details may be received by a routing apparatus, such as routing apparatus 110 of FIG. 1. Next, the encrypted contact details are decrypted (operation 504) using a key. Finally, communication from the recipient to the entity is routed using the decrypted contact details without providing the decrypted contact details to the recipient (operation 506).

For example, the routing apparatus may decrypt a phone number from the electronic business card and provide an anonymous phone number to the recipient. The recipient may call the anonymous phone number to reach the entity. The routing apparatus may then connect the recipient to the entity by routing the call to the decrypted phone number.

Figure 6:
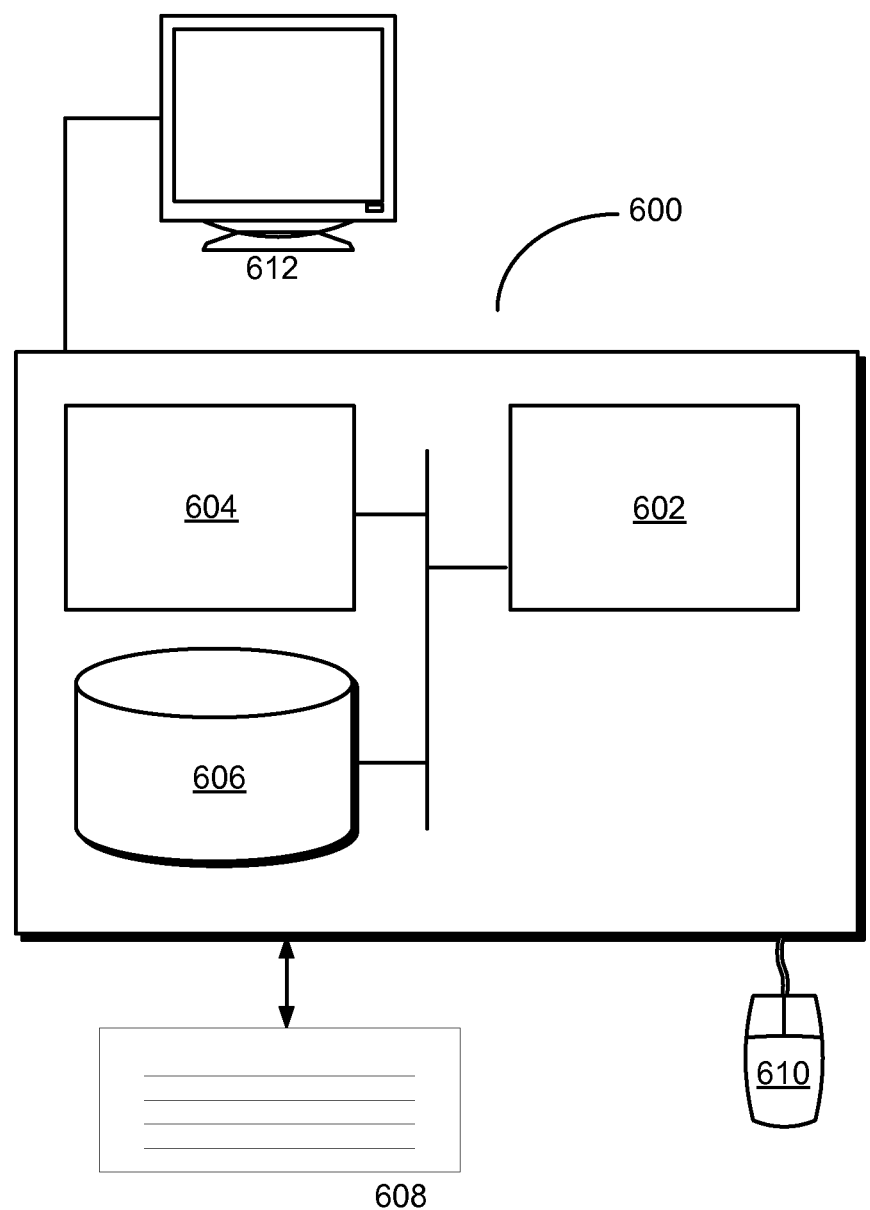
FIG. 6 shows a computer system in accordance with an embodiment.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating the secure exchange and use of an electronic business card. The system may include a card-processing apparatus that obtains one or more permissions for the electronic business card and manages use of the electronic business card by a recipient of the electronic business card based on the permissions. The system may also include a routing apparatus that facilitates communication between the recipient and an entity represented by the electronic business card. In particular, the routing apparatus may receive a portion of the electronic business card containing one or more encrypted contact details for the entity, decrypt the encrypted contact details, and route communication from the recipient to the entity using the decrypted contact details without providing the decrypted contact details to the recipient.

In addition, one or more components of computer system 600 may be remotely located and connected to the other components over a network. Portions of the present embodiments (e.g., card-processing apparatus, routing apparatus, etc.) may also be located on different nodes of a distributed system that implements the embodiments. For example, the present embodiments may be implemented using a cloud computing system that enables the exchange of electronic business cards among a variety of network-enabled computing devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the use of an electronic business card, comprising:
    obtaining, by using one or more computers, one or more permissions for the electronic business card, wherein the electronic business card includes the permissions and contact details for an entity represented by the electronic business card; and
    managing, by using the one or more computers, use of the electronic business card by a recipient of the electronic business card based on the permissions, wherein managing the use of the electronic business card comprises, if the permissions indicate that the recipient is not allowed to view the contact details, allowing the recipient to contact the entity using the contact details without providing the contact details to the recipient by sending encrypted data for the contact details to a routing apparatus and by establishing contact with the entity through the routing apparatus.

2. The computer-implemented method of claim 1, further comprising:
receiving the electronic business card and the permissions from a sender of the electronic business card.

3. The computer-implemented method of claim 1, wherein the permissions include at least one of a visibility permission and a forwarding permission.

4. The computer-implemented method of claim 3, wherein managing use of the electronic business card by the recipient of the electronic business card based on the permissions involves:
enabling communication between the recipient and the entity;
using the forwarding permission to control forwarding of the electronic business card by the recipient; and
using the visibility permission to control viewing of the contact details in the electronic business card by the recipient.

5. The computer-implemented method of claim 4, wherein enabling communication between the recipient and the entity involves:
providing the contact details to the recipient if the visibility permission is granted.

6. The computer-implemented method of claim 4, wherein using the forwarding permission to control forwarding of the electronic business card by the recipient involves:
disabling forwarding of the electronic business card by the recipient if the forwarding permission is denied; and
if the forwarding permission is granted:
enabling forwarding of the electronic business card by the recipient; and
enabling modification of at least some of the permissions by the recipient prior to forwarding the business card.

7. The computer-implemented method of claim 4, wherein the contact details are at least one of a name, an email address, a phone number, a mailing address, a website, and a username.

8. The computer-implemented method of claim 4, wherein managing use of the electronic business card by the recipient of the electronic business card based on the permissions further involves:
using a time-to-live (TTL) attribute to limit forwarding of the electronic business card.

9. A computer-implemented method for enabling communication between a recipient of an electronic business card and an entity represented by the electronic business card, comprising:
receiving a portion of the electronic business card containing one or more encrypted contact details for the entity from the recipient;
decrypting the encrypted contact details; and
if permissions for the electronic business card indicate that the recipient is not allowed to view the decrypted contact details, using the decrypted contact details to route communication from the recipient to the entity without providing the decrypted contact details to the recipient by sending encrypted data for the contact details to a routing apparatus and by establishing contact with the entity through the routing apparatus.

10. The computer-implemented method of claim 9, wherein the encrypted contact details are associated with a visibility permission for the electronic business card.

11. A system for facilitating the use of an electronic business card, comprising:
a card-processing apparatus configured to:
obtain one or more permissions for the electronic business card, wherein the electronic business card includes the permissions and contact details for an entity represented by the electronic business card; and
manage use of the electronic business card by a recipient of the electronic business card based on the permissions; and
a routing apparatus configured to facilitate communication between the recipient and the entity,
wherein, while managing the use of the electronic business card, the card-processing apparatus is configured to, if the permissions indicate that the recipient is not allowed to view the contact details, allow the recipient to contact the entity using the contact details without providing the contact details to the recipient by sending encrypted data for the contact details to the routing apparatus, and
wherein, while facilitating the communication, the routing apparatus is configured to obtain decrypted data by decrypting the encrypted data, and is further configured to provide the communication to the entity using the decrypted data.

12. The system of claim 11, wherein the card-processing apparatus is further configured to receive the electronic business card and the permissions from a sender of the electronic business card.

13. The system of claim 11, wherein the permissions include at least one of a visibility permission and a forwarding permission.

14. The system of claim 13, wherein managing use of the electronic business card by the recipient of the electronic business card based on the permissions involves:
enabling communication between the recipient and the entity;
using the forwarding permission to control forwarding of the electronic business card by the recipient; and
using the visibility permission to control viewing of the contact details in the electronic business card by the recipient.

15. The system of claim 14, wherein enabling communication between the recipient and the entity involves:
providing the contact details to the recipient if the visibility permission is granted.

16. The system of claim 15, wherein the contact details are encrypted if the visibility permission is denied, and
wherein the routing apparatus is further configured to:
decrypt the encrypted contact details; and
route communication from the recipient to the entity using the decrypted contact details without providing the decrypted contact details to the recipient.

17. The system of claim 14, wherein using the forwarding permission to control forwarding of the electronic business card by the recipient involves:
disabling forwarding of the electronic business card by the recipient if the forwarding permission is denied; and
if the forwarding permission is granted:
enabling forwarding of the electronic business card by the recipient; and enabling modification of at least some of the permissions by the recipient prior to forwarding the business card.

18. A non-transitory computer-readable storage medium storing instructions that when executed by a computer cause the computer to perform a method for facilitating the use of an electronic business card, the method comprising:
    obtaining one or more permissions for the electronic business card, wherein the electronic business card includes the permissions and contact details for an entity represented by the electronic business card; and
    managing use of the electronic business card by a recipient of the electronic business card based on the permissions, wherein managing the use of the electronic business card comprises, if the permissions indicate that the recipient is not allowed to view the contact details, allowing the recipient to contact the entity using the contact details without providing the contact details to the recipient by sending encrypted data for the contact details to a routing apparatus and by establishing contact with the entity through the routing apparatus.

19. The computer-readable storage medium of claim 18, the method further comprising:
    receiving the electronic business card and the permissions from a sender of the electronic business card.

20. The computer-readable storage medium of claim 18, wherein the permissions include at least one of a visibility permission and a forwarding permission.

21. The computer-readable storage medium of claim 20, wherein managing use of the electronic business card by the recipient of the electronic business card based on the permissions involves:
    enabling communication between the recipient the entity;
    using the forwarding permission to control forwarding of the electronic business card by the recipient; and
    using the visibility permission to control viewing of the contact details in the electronic business card by the recipient.

22. The computer-readable storage medium of claim 21, wherein enabling communication between the recipient and the entity involves:
    providing the contact details to the recipient if the visibility permission is granted.

23. The computer-readable storage medium of claim 21, wherein using the forwarding permission to control forwarding of the electronic business card by the recipient involves:
    disabling forwarding of the electronic business card by the recipient if the forwarding permission is denied; and
    if the forwarding permission is granted:
        enabling forwarding of the electronic business card by the recipient; and
        enabling modification of at least some of the permissions by the recipient prior to forwarding the business card.

* * * * *